United States Patent
Zhao

(10) Patent No.: US 11,778,596 B2
(45) Date of Patent: Oct. 3, 2023

(54) DATA TRANSMISSION METHOD, APPARATUS, DEVICE AND SYSTEM FOR DIRECT COMMUNICATION

(71) Applicant: BEIJING XIAOMI MOBILE SOFTWARE CO., LTD., Beijing (CN)

(72) Inventor: Qun Zhao, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 275 days.

(21) Appl. No.: 17/356,435

(22) Filed: Jun. 23, 2021

(65) Prior Publication Data
US 2021/0321380 A1 Oct. 14, 2021

Related U.S. Application Data

(63) Continuation of application No. PCT/CN2018/125825, filed on Dec. 29, 2018.

(51) Int. Cl.
*H04W 72/044* (2023.01)
*H04L 1/1607* (2023.01)
*H04L 5/00* (2006.01)

(52) U.S. Cl.
CPC ......... *H04W 72/044* (2013.01); *H04L 1/1671* (2013.01); *H04L 5/0042* (2013.01)

(58) Field of Classification Search
CPC ....... H04W 72/044; H04W 4/40; H04W 4/70; H04W 72/23; H04W 72/0453; H04W 72/1263; H04W 72/20; H04L 1/1671; H04L 5/0042; H04L 1/1854; H04L 1/1861; H04L 1/1864; H04L 1/1896; H04L 1/1822; H04L 5/0091; H04L 5/0055; H04L 1/1607; H04L 1/1812; H04L 5/0044; H04L 5/0092
See application file for complete search history.

(56) References Cited

U.S. PATENT DOCUMENTS

| 2015/0189642 A1 | 7/2015 | Yang et al. |
| 2015/0319746 A1 | 11/2015 | Lu et al. |

(Continued)

FOREIGN PATENT DOCUMENTS

| CN | 103825687 A | 5/2014 |
| CN | 104885396 A | 9/2015 |

(Continued)

OTHER PUBLICATIONS

JPOA of Application No. 2021-536716 dated Jul. 15, 2022 with English translation,(12p).

(Continued)

*Primary Examiner* — Sharmin Chowdhury
(74) *Attorney, Agent, or Firm* — Arch & Lake LLP

(57) ABSTRACT

A data transmission method, apparatus, device and system for direct communication are provided. The method includes that a first terminal sends, according to information sent by an access network device, sidelink data to a second terminal through a sidelink. The first terminal receives sidelink hybrid auto repeat request (HARQ) feedback information fed back by the second terminal, where the sidelink HARQ feedback information is configured to indicate a receiving state corresponding to the sidelink data. The first terminal reports the sidelink HARQ feedback information to the access network device.

18 Claims, 6 Drawing Sheets

(56) References Cited

U.S. PATENT DOCUMENTS

| | | |
|---|---|---|
| 2018/0206176 A1 | 7/2018 | Panteleev et al. |
| 2020/0029318 A1* | 1/2020 | Guo ..................... H04L 1/1822 |
| 2020/0228257 A1* | 7/2020 | Baldemair ............ H04L 1/1614 |
| 2022/0053521 A1* | 2/2022 | Yoshioka .............. H04L 1/1896 |

FOREIGN PATENT DOCUMENTS

| | | |
|---|---|---|
| CN | 105553612 A | 5/2016 |
| CN | 109075908 A | 12/2018 |
| JP | WO2020136852 A1 | 11/2021 |
| NO | 2018203738 A | 11/2018 |
| WO | 2017025141 A1 | 2/2017 |
| WO | 2018135867 A1 | 7/2018 |

OTHER PUBLICATIONS

Extended European Search Report issued in Application No. 18944590.1, dated Jun. 22, 2022,(10p).

Samgung, "Discussion on Physical Layer Procedures", 3GPP TSG-RAN WG1 Meeting #95 R1-1812985 Spokane, USA, Nov. 12-16, 2018, (7p).

Office Action issued in Indian Patent Application No. 202147031000 dated Feb. 28, 2022 with partial English translation, (5p).

International Search Report of PCT/CN2018/125825 dated Apr. 28, 2019 with English translation, (4p).

\* cited by examiner

DATA TRANSMISSION METHOD, APPARATUS, DEVICE AND SYSTEM FOR DIRECT COMMUNICATION

This application is a continuation application of International Application No. PCT/CN2018/125825, filed on Dec. 29, 2018, the entire contents of which are incorporated herein by reference for all purposes.

TECHNICAL FIELD

The present disclosure relates to the field of communication technology, and particularly to a data transmission method, apparatus, device and system for direct communication.

BACKGROUND

In a vehicle to everything (V2X) technology, direct communication may be performed between a vehicle device and other devices (for example, other vehicle devices, roadside infrastructure, etc.) through a sidelink. Direct communication is characterized by short delay and low overhead.

In the related art, a direct communication mode based on scheduling of an access network device includes following. The access network device transmits scheduling information to a user equipment at a direct communication transmitting end (simply referred to as a first terminal) through downlink control information (DCI), and the first terminal transmits sidelink data to a user equipment at a direct communication receiving end (simply referred to as a second terminal) through a sidelink according to scheduling information of the access network device.

In a long term evolution (LTE) V2x, only broadcast transmission at the physical layer is supported and a hybrid auto repeat request (HARQ) feedback at the physical layer is not supported. At present, there is still no suitable solution how the second terminal reports HARQ feedback to the access network device.

SUMMARY

According to a first aspect of the present disclosure, a data transmission method for direct communication is provided, which is applied to a first terminal. The method includes: transmitting sidelink data to a second terminal through a sidelink according to information transmitted by an access network device; receiving sidelink HARQ feedback information fed back by the second terminal, where the sidelink HARQ feedback information is configured to indicate a receiving state corresponding to the sidelink data; and reporting the sidelink HARQ feedback information to the access network device.

According to a second aspect of the present disclosure, a data transmission method for direct communication is provided, which is applied to an access network device. The method includes: transmitting information to a first terminal, where the information is configured to instruct the first terminal to transmit sidelink data to a second terminal through a sidelink and receive sidelink HARQ feedback information fed back by the second terminal, the sidelink HARQ feedback information is configured to indicate a receiving state corresponding to the sidelink data and report the sidelink HARQ feedback information to the access network device; and receiving the sidelink HARQ feedback information reported by the first terminal.

According to a third aspect of the present disclosure, a terminal is provided. The terminal includes: a processor; a transceiver connected to the processor; and a memory configured to store instructions executable by the processor. The processor is configured to load and execute the executable instructions to implement the data transmission method for direct communication described in the first aspect.

According to a fourth aspect of the present disclosure, the access network device is provided. The device includes: a processor; a transceiver connected to the processor; a memory configured to store instructions executable by the processor; in which, the processor is configured to load and execute the executable instructions to implement the data transmission method for direct communication described in the second aspect.

According to a fifth aspect of the present disclosure, a data transmission system for direct communication is provided. The data transmission system includes a terminal as described in the third aspect and an access network device as described in the fourth aspect.

According to a sixth aspect of the present disclosure, a computer readable storage medium is provided. The computer readable storage medium stores at least one instruction, at least one program, a code set and an instruction set, the at least one instruction, the at least one program, the code set or the instruction set being configured to be loaded and executed by the processor to implement steps of the data transmission method for direct communication as described in the first aspect, or implement steps of the data transmission method for direct communication as described in the second aspect.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The exemplary embodiments will be described in detail here, and examples thereof are shown in the accompanying drawings. When the following descriptions refer to the accompanying drawings, unless otherwise indicated, the same numbers in different drawings represent the same or similar elements. The implementations described in the following exemplary embodiments do not represent all the implementations consistent with the present invention. Rather, they are merely examples of the apparatus and method consistent with some aspects of the present invention as detailed in the appended claims.

The network architecture and business scenario described in embodiments of the present disclosure are intended to explain the technical solutions of embodiments of the present disclosure more clearly, and does not constitute a limitation to the technical solutions provided by embodiments of the present disclosure. The ordinary technicians in the art know that, with the evolution of network architecture and the emergence of new business scenarios, the technical solutions provided in embodiments of the present disclosure are equally applied to similar technical issues.

Figure 1:
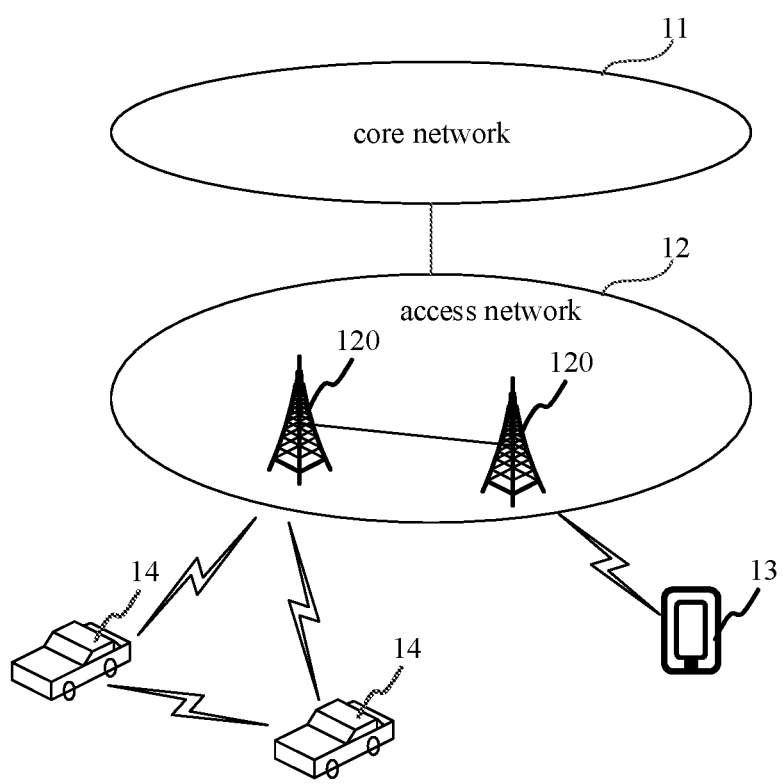
FIG. 1 is a diagram illustrating a network architecture to which embodiments of the present disclosure may apply.

FIG. 1 illustrates a diagram of a network architecture to which embodiments of the present disclosure may apply. The network architecture may be a network architecture of a C-V2X system. C refers to Cellular, and the C-V2X system is a vehicle-mounted wireless communication system based on the evolution of 3G, 4G or 5G cellular network communication systems. The network architecture may include a core network 11, an access network 12, a terminal 13 and a vehicle 14.

The core network 11 includes several core network devices. The main function of the core network device is to provide user connection and user management and complete service bearing, providing an interface to an external network as a hosted network. For example, a core network of a long term evolution (LTE) system may include a mobility management entity (MME), a serving gateway (S-GW), a PDN Gateway (P-GW), etc. The core network of a 5G NR system may include an access and mobility management function (AMF) entity, a user plane function (UPF) entity and a session management function (SMF) entity.

The access network 12 includes several access network devices 120. The access network device 120 and the core network device 110 communicate with each other through some kind of interface technology, for example, S1 interface in the LTE system, NG interface in the 5G NR system. The access network device 120 may be a base station (BS), in which the base station is an apparatus deployed in the access network to provide wireless communication function for the terminal. The base station may include various forms of macro base stations, micro base stations, relay stations, access points, etc. In the system adopting different wireless access technologies, the name of the device with base station function may vary. For example, in LTE system, it is referred to as eNodeB or eNB; in 5G NR system, it is referred to as gNodeB or gNB. With evolution of communication technology, the name of "base station" may vary. For convenience of description, in embodiments of the present disclosure, the above apparatus that provides wireless communication function for the terminal is collectively referred to as the access network device.

The terminal 13 may include all kinds of devices with wireless communication function, such as handheld devices, vehicle-mounted devices, wearable devices, computing devices or other processing devices connected to wireless modems, as well as various forms of user equipment (UE), mobile stations (MS), terminal devices, etc. For convenience of description, the device mentioned above are collectively referred to as terminal. The access network device 120 and the terminal 13 communicate with each other through some kind of air interface technology, for example, a Uu interface.

The vehicle 14 may be an autonomous vehicle, or may be a non-autonomous vehicle. The vehicle has a vehicle-mounted device, via which the vehicle 14 implements communication with other vehicles, the terminal 13 and other devices, for example, a road side unit (RSU). The vehicle-mounted device may be referred to as a vehicle-mounted terminal, a vehicle-mounted communication device, etc., which is not limited here. The vehicle-mounted device may be a device integrated in a Telematics BOX (T-BOX), and may also be a device that separates from the vehicle body. In addition, the vehicle-mounted device may be assembled in the vehicle 14 before the vehicle 14 leaves the factory, and may also be assembled in the vehicle 14 after the vehicle 14 leaves the factory.

The vehicle-mounted device of the vehicle 14 may communicate with other devices (for example, other vehicle-mounted devices, the terminal 13, the RSU, etc.) through a direct communication interface (for example, a PC5 interface), and accordingly, the communication link established based on the direct communication interface may be referred to as a direct link or a sidelink. In addition, between the vehicle-mounted device of the vehicle 14 and other devices, transfer may be performed through the access network 12 and the core network 11, i.e., the communication link between the terminal 13 and the access network device 120 in the original cellular network are adopted for communication. Compared with communication based on the Uu interface, communication based on the direct communication interface is characterized by short delay, low overhead, etc., which is suitable for communication between the vehicle-mounted device and other peripheral devices that are geographically close.

The network architecture illustrated in FIG. 1 may implement a V2X service scenario, and may also include devices such as the RSU, a V2X application server, and a V2X control function node, which is not limited in embodiments of the present disclosure. In addition, the technical solution in embodiments of the present disclosure may be applied to a 5G NR system, and may also be applied to a subsequent evolution system of a 5G NR system.

In embodiments of the present disclosure, for a direct communication scenario in the above V2X business scenario, a data transmission method for direct communication is provided to solve resource conflict issues.

In embodiments of the present disclosure, a first terminal and a second terminal are devices at two ends for direct communication in the V2X business scenario, which may establish a sidelink through the direct communication interface (for example, the PC5 interface) and perform user data and control signaling interaction through the sidelink. For example, the first terminal may be the vehicle-mounted device of the vehicle 14 in the network architecture as illustrated in FIG. 1, and the second terminal may be the vehicle-mounted device of other vehicles, or may also be the terminal 13 or the RSU. For another example, the first terminal may be the terminal 13 in the network architecture as illustrated in FIG. 1, and the second terminal may be other terminals, or may also be the vehicle-mounted device of the vehicle 14 or the RSU. In some embodiments, for the same device (for example, the same vehicle-mounted device or the same terminal) it may be the first terminal in some scenarios, and may also be the second terminal in other scenarios.

In embodiments of the present disclosure, the first terminal is referred to as a UE at a direct communication transmitting end, and the second terminal is referred to as a UE at a direct communication receiving end.

The technical solution in the present disclosure is described in several exemplary embodiments.

Figure 2:
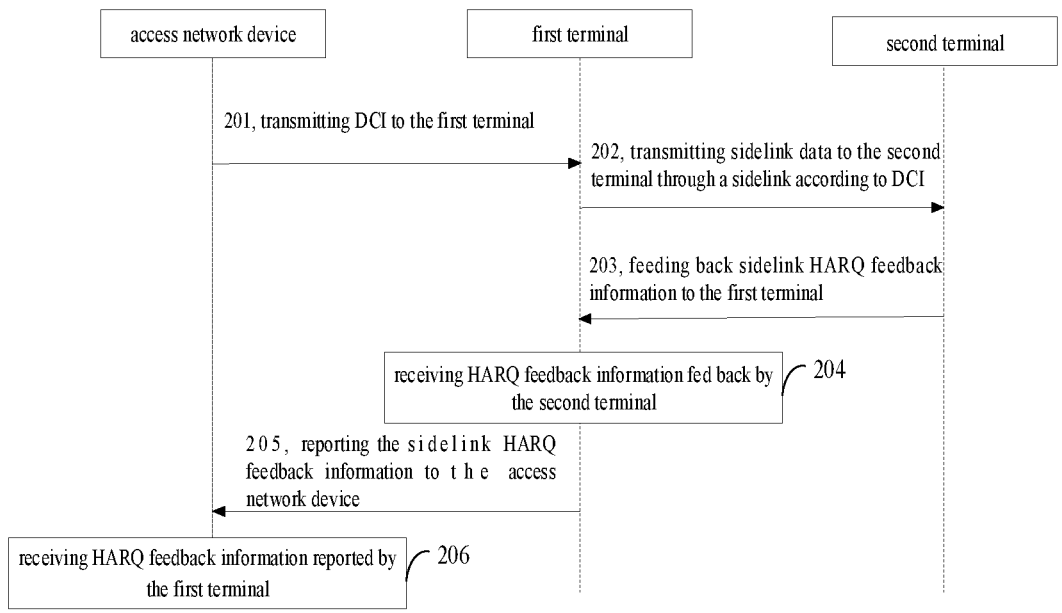
FIG. 2 is a flowchart illustrating a data transmission method for direct communication according to an exemplary embodiment.

FIG. 2 is a flowchart illustrating a data transmission method for direct communication according to an exemplary embodiment. The method may be applied to the network structure as illustrated in FIG. 1. The method may include following steps.

At step 201, the access network device transmits information to the first terminal.

Optionally, the access network device transmits DCI to the first terminal, the DCI carrying data transmission parameters.

At step 202, the first terminal transmits sidelink data to the second terminal through a sidelink according to the information.

For example, the first terminal transmits sidelink data to the second terminal through the sidelink according to the DCI transmitted by the access network device.

Optionally, the first terminal receives the DCI transmitted by the access network device through a downlink channel, and transmits the sidelink data to the second terminal through the sidelink according to the data transmission parameters in the DCI.

Optionally, the DCI is configured to schedule sidelink data transmission.

For example, the downlink channel includes a physical downlink control channel (PDCCH).

Optionally, the data transmission parameters are configured to indicate a time-frequency resource and/or a modulation and coding scheme (MCS).

Optionally, the first terminal receives DCI transmitted by the access network device through the downlink channel and transmits sidelink data to the second terminal through the sidelink according to the time-frequency resource and/or the MCS indicated by the data transmission parameters in DCI.

The sidelink data refers to physical layer data transmitted by the first terminal to the second terminal through the sidelink.

The first terminal transmits the sidelink data to the second terminal with the fourth time-frequency resource of the sidelink.

Optionally, the fourth time-frequency resource is a predefined or preconfigured time-frequency resource.

Optionally, the first terminal may also send control information to the second terminal before or when transmitting the sidelink data, the control information being configured to indicate receiving related information of the physical layer data.

Optionally, receiving related information includes a time-domain position and/or a frequency-domain position of the fourth time-frequency resource for carrying the physical layer data. In some embodiments, receiving related information further includes information such as a modulation and coding scheme (MCS), a hybrid ARQ process number (HARQ-ID), a new data indicator (NDI) of the physical layer data.

At step 203, the second terminal feed backs sidelink HARQ feedback information to the first terminal.

Correspondingly, the second terminal receives sidelink data transmitted by the first terminal. Optionally, the second terminal receives sidelink data transmitted by the first terminal by using the fourth time-frequency resource of the sidelink.

The second terminal feed backs sidelink HARQ feedback information to the first terminal, the sidelink HARQ feedback information including HARQ feedback bits corresponding to at least one sidelink data transmission.

For example, the number of HARQ feedback bits corresponding to one sidelink data transmission is 1 bit or 2 bits.

The sidelink HARQ feedback information is configured to indicate a receiving state corresponding to the sidelink data. The receiving state corresponding to the sidelink data includes: Acknowledgement (ACK) or Non-Acknowledgement (NACK).

The ACK is configured to indicate that the sidelink data is correctly received by the second terminal.

The NACK includes an unreceived state and/or an incorrect received state. The unreceived state is configured to indicate that the sidelink data is not received by the second terminal. The incorrect received state is configured to indicate that although the sidelink data is received by the second terminal, the sidelink data received by the second terminal is different from the sidelink data transmitted by the first terminal, that is, the wrong sidelink data is received.

The second terminal processes the received sidelink data after receiving the sidelink data, for example, the second terminal performs demodulation, decoding and the like on the sidelink data. During the processing, the second terminal may determine the receiving state of sidelink data.

Optionally, the second terminal transmits the sidelink HARQ feedback information to the first terminal through a direct channel. For example, the direct channel is a PSFCH.

At step 204, the first terminal receives sidelink HARQ feedback information fed back by the second terminal.

Correspondingly, the first terminal receives sidelink HARQ feedback information transmitted by the second terminal through the PSFCH.

It is to be noted that, the direct communication scenario of the first terminal and the second terminal in embodiments of the present disclosure is a direct communication scenario based on scheduling of the access network device. That is, the first terminal transmits data based on scheduling of the access network device. For the way of direct communication based on scheduling of the access network device, since the scheduling is completed by the access network device, the sidelink HARQ feedback information corresponding to the sidelink data needs to be transmitted back to the access network device from the second terminal, in order to facilitate retransmission of scheduled data at the access network device side or transmission of new data. Considering that the first terminal and the second terminal may be in the coverage ranges of different access network devices or beyond the coverage of the network, the sidelink HARQ feedback information may be transmitted from the second terminal to the first terminal first, and then reported by the first terminal to the access network device.

At step 205, the first terminal reports the sidelink HARQ feedback information to the access network device.

Optionally, the first terminal reports the sidelink HARQ feedback information to the access network device on a physical layer uplink channel of a target time unit.

Optionally, the target time unit refers to a corresponding time unit when the terminal device needs to transmit uplink HARQ feedback bits and sidelink HARQ feedback information. For example, the target time unit includes a symbols, b symbol groups, c slots and d subframes, in which, a, b, c, d are positive integers, which are not limited here.

Optionally, the physical layer uplink channel is an uplink channel for transmitting the sidelink HARQ feedback information to the access network device.

Optionally, the physical layer uplink channel is an uplink channel based on a first communication protocol or a second communication protocol. The first communication protocol includes the LTE protocol, and the second communication protocol includes the NR protocol.

Optionally, the physical layer uplink channel is a PUCCH. For example, a PUCCH channel format is any one of a PUCCH format 1, a PUCCH format 1a, a PUCCH format 1b, a PUCCH format 2, a PUCCH format 2a, a PUCCH format 2b, a PUCCH format 3, a PUCCH format 4 and a PUCCH format 5.

At step 206, the access network device receives sidelink HARQ feedback information reported by the first terminal.

In summary, in this embodiment, the first terminal transmits sidelink data to the second terminal through the sidelink, receives HARQ feedback information fed back by the second terminal, the sidelink HARQ feedback information being configured to indicate the receiving state corresponding to the sidelink data, and reports the sidelink HARQ feedback information to the access network device. Therefore, in the direct communication scenario based on scheduling of the access network device, even if the first terminal and the second terminal may be in the coverage ranges of different access network devices or beyond the coverage of the network, the sidelink HARQ feedback information may be transmitted from the second terminal to the first terminal first, and then reported by the first terminal to the access network device, which ensures the success rate of information transmitting and receiving in the direct communication scenario and improves the efficiency of data transmission.

It is to be noted that, since various time-frequency resources are involved in embodiments of the present disclosure, the time-frequency resources are described first.

The first time-frequency resource is a time domain and/or frequency domain resource used by the first terminal to report the sidelink HARQ feedback information to the access network device.

The second time-frequency resource is a time domain and/or frequency domain resource used by the second terminal to transmit the sidelink HARQ feedback information to the first terminal.

The third time-frequency resource is a time domain and/or frequency domain resource used by the access network device to transmit the DCI to the first terminal.

The fourth time-frequency resource is a time domain and/or frequency domain resource used by the first terminal to transmit the sidelink data to the second terminal.

Figure 3:
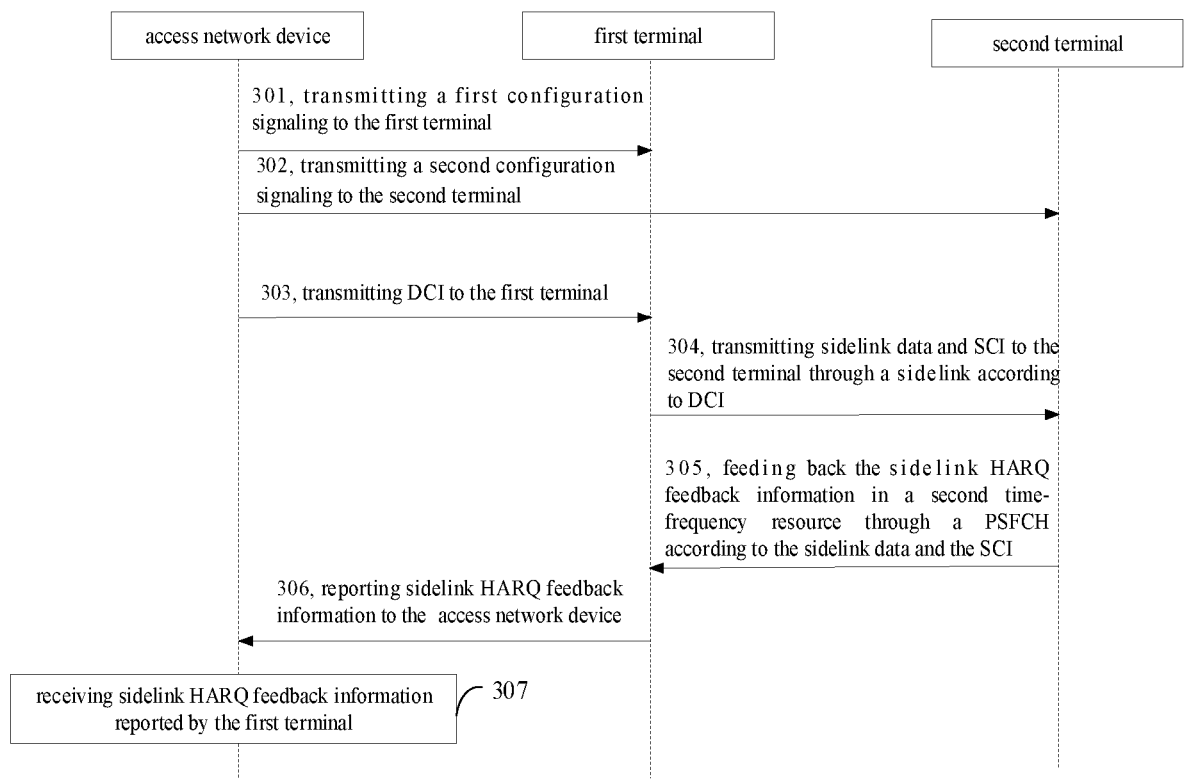
FIG. 3 is a flowchart illustrating a data transmission method for direct communication according to another exemplary embodiment.

FIG. 3 is a flowchart illustrating a data transmission method for direct communication according to an exemplary embodiment. The method may be applied to the network structure as illustrated in FIG. 1. The method may include the following steps.

At step 301, the access network device transmits a first configuration signaling to the first terminal.

Optionally, the first configuration signaling is configured to indicate a first time interval set and/or a PUCCH resource set corresponding to the sidelink HARQ feedback information.

The PUCCH resource set includes a plurality of PUCCH resources configured to report the sidelink HARQ feedback information, and the first time interval set includes configured time intervals between the sidelink data transmission and reporting the corresponding sidelink HARQ feedback information by the first terminal.

Optionally, the first configuration signaling is a first RRC signaling, the first RRC signaling including a first newly added field and a second newly added field, the first newly added field being configured to indicate the PUCCH resource set, and the second newly added field being configured to indicate the first time interval set.

For example, the first newly-added field resourceSetSL in the first RRC signaling PUCCH-config is dedicated to configuring a PUCCH resource used by the sidelink HARQ feedback information, and the second newly-added field Sl-DataToUL-ACK is dedicated to configuring the first time internal set.

At step 302, the access network device transmits a second configuration signaling to the second terminal.

Optionally, the second configuration signaling is configured to indicate a second time interval set and/or a PSFCH resource set corresponding to the sidelink HARQ feedback information.

The PSFCH resource set includes a plurality of PSFCH resources configured to report the sidelink HARQ feedback information, and the second time interval set includes configured time intervals between the sidelink data transmission and feeding back the corresponding sidelink HARQ feedback information by the second terminal.

Optionally, the access network device transmits the second configuration signaling to the first terminal and/or the second terminal.

In a possible implementation, the access network device transmits the second configuration signaling to the first terminal and the second terminal respectively. Correspondingly, both the first terminal and the second terminal receive the second configuration signaling transmitted by the access network device.

Optionally, the second configuration signaling is a second RRC signaling, the second RRC signaling including a third newly added field and a fourth newly added field, the third newly added field being configured to indicate the PSFCH resource set, and the fourth newly added field being configured to indicate the second time interval set.

For example, the third newly-added field resourceSetSL in the second RRC signaling PSFCH-config is dedicated to configuring a PSFCH resource used by sidelink HARQ feedback information, and the fourth newly-added field Sl-DataToUL-ACK is dedicated to configuring the second time interval set.

In a possible implementation, the access network device transmits the second configuration signaling to the first terminal, and then the first terminal transfers the second configuration signaling to the second terminal.

In another possible implementation, the access network device transmits the second configuration signaling to the second terminal, and then the second terminal transmits the second configuration signaling to the first terminal. The implementation of transmitting the second configuration signaling by the access network device to the second terminal is not limited.

At step 303, the access network device transmits information to the first terminal.

The information may be DCI. The DCI is configured to indicate the first terminal to transmit sidelink data to the second terminal through a sidelink. Optionally, the DCI is configured to indicate the first terminal to transmit the fourth time-frequency resource of the sidelink data to the second terminal.

Optionally, the access network device indicates data transmission parameters to the first terminal in an explicit manner or an implicit manner, the data transmission parameter being configured to indicate the first time-frequency resource and/or the second time-frequency resource.

The access network device indicates the data transmission parameters to the first terminal in an explicit manner as follows. The access network device transmits DCI to the first terminal, the DCI carrying the data transmission parameters configured to indicate the first time-frequency resource and the second time-frequency resource.

Optionally, the data transmission parameters include at least one of:
- a first physical resource indicator, configured to represent a time domain and/or frequency domain resource used by the first terminal for reporting the sidelink HARQ feedback information;
- a first feedback timing indicator, configured to represent a time interval between the sidelink data transmission and reporting the corresponding sidelink HARQ feedback information by the first terminal;
- a second physical resource indicator, configured to represent a time domain and/or frequency domain resource used by the second terminal for transmitting the sidelink HARQ feedback information;
- a second feedback timing indicator, configured to represent a time interval between the sidelink data transmission and feeding back the corresponding sidelink HARQ feedback information by the second terminal.

For example, the first physical resource indicator is a PUCCH resource indicator, which is configured for the first time domain resource, and the first feedback timing indicator is a PSSCH-to-ULHARQ_feedback timing indicator. The second physical resource indicator is a PFSCH resource indicator, and the second feedback timing indicator is a PSSCH-to-SLHARQ_feedback timing indicator. The time-domain resource refers to a time domain length and specific time domain symbols occupied in a slot.

Optionally, the time domain and/or frequency domain resource used by the first terminal to report the sidelink HARQ feedback information is the first time-frequency resource, the first time-frequency resource being one PUCCH resource in the PUCCH resource set configured by the access network device for the sidelink HARQ feedback information.

Optionally, the time domain and/or frequency domain resource used by the second terminal to transmit the sidelink HARQ feedback information is the second time-frequency resource, the second time-frequency resource being one PSFCH resource in the PSFCH resource set configured by the access network device for the sidelink HARQ feedback information.

At step 304, the first terminal transmits sidelink data and SCI to the second terminal through a sidelink according to DCI.

Correspondingly, the first terminal determines according to DCI, data transmission parameters indicated by the access network device in an explicit manner or an implicit manner, the data transmission parameters being configured to indicate the first time-frequency resource and/or the second time-frequency resource.

When the access network device indicates the data transmission parameters to the first terminal in an explicit manner, the corresponding first terminal receives DCI transmitted by the access network device, the DCI carrying data transmission parameters configured to indicate the first time-frequency resource and the second time-frequency resource, and transmits the data transmission parameter configured to indicate the second time-frequency resource to the second terminal.

That is, when DCI is configured to indicate the first time-frequency resource, the second frequency resource and the fourth time-frequency resource, the first terminal prepares to report the sidelink HARQ feedback information according to the first time-frequency resource, and transmits the sidelink data and the SCI to the second terminal by using the fourth time-frequency resource of the sidelink, in which, the SCI carries the data transmission parameter configured to indicate the second time-frequency resource.

At step 305, the second terminal feed backs the sidelink HARQ feedback information in the second time-frequency resource through a PSFCH according to the sidelink data and the SCI.

The second time-frequency resource may be explicitly configured by the access network device, and may also be implicitly indicated by the access network device.

In a possible implementation, the second time-frequency resource is explicitly configured by the access network device. The second time-frequency resource includes a PUCCH resource preconfigured to be used by the second terminal for transmitting the sidelink HARQ feedback to the first terminal.

Optionally, the second terminal receives sidelink data and SCI transmitted by the first terminal, to determine the second time-frequency resource indicated by the SCI.

In another possible implementation, the second time-frequency resource is implicitly indicated by the access network device, that is, the second time-frequency resource is obtained by the first terminal or the second terminal according to the defined mapping rule. The second time-frequency resource includes: a PSFCH resource mapped by the second terminal according to the fourth time-frequency resource used for transmitting the sidelink data; or, a PSFCH resource mapped by the second terminal according to the first time-frequency resource used by the first terminal for reporting the sidelink HARQ feedback information.

Optionally, the mapping rule is predefined or preconfigured.

For example, the mapping rule of the second time-frequency resource and the fourth time-frequency resource includes that, the frequency domain starting position of the second time-frequency resource is the same as that of the fourth time-frequency resource, and the time unit used by the second time-frequency resource is the Kth time unit after the time unit used by the fourth time-frequency resource, where K is a positive integer.

For another example, the mapping rule of the second time-frequency resource and the first time-frequency resource includes that, the frequency domain starting position of the second time-frequency resource is the same as that of the first time-frequency resource, and the time unit used by the second time-frequency resource is the Mth time unit before the time unit used by the first time-frequency resource, where M is a positive integer. In this embodiment, the way of obtaining the second time-frequency resource according to the mapping rule is not limited.

In another possible implementation, the second time-frequency resource is decided by the first terminal or the second terminal itself. The second time-frequency resource includes a PSFCH resource configured by the first terminal or the second terminal according to the first time-frequency resource and the preset timing relationship.

Optionally, the first terminal or the second terminal itself decides the second time-frequency resource, and the second time-frequency resource meets the time delay requirement of the first terminal to report the sidelink HARQ feedback information. For example, the preset timing relationship includes the time unit used by the second time-frequency resource being earlier than that used by the first time-frequency resource, and an absolute value of a difference between both being greater than a transmission threshold.

The sidelink HARQ feedback information is configured to indicate the receiving state corresponding to the sidelink data. The receiving state corresponding to the sidelink data includes ACK or NACK.

At step 306, the first terminal reports sidelink HARQ feedback information to the access network device.

Optionally, the first terminal receives the sidelink HARQ feedback information fed back by the second terminal, and reports the sidelink HARQ feedback information to the access network device in the first time-frequency resource through the PUCCH.

Optionally, the first time-frequency resource may be explicitly configured by the access network device, and may also be implicitly indicated by the access network device.

In a possible implementation, the second time-frequency resource is explicitly configured by the access network device, and the first time-frequency resource includes a PUCCH resource preconfigured for transmitting uplink HARQ feedback information of downlink data, or a PUCCH resource preconfigured to be used by the first terminal for reporting the sidelink HARQ feedback.

Optionally, the first terminal reuses the PUCCH resource preconfigured for transmitting the uplink HARQ feedback information of downlink data to report the sidelink HARQ feedback information to the access network device.

Optionally, the DCI received by the first terminal carries the data transmission parameter configured to indicate the first time-frequency resource, and the second terminal reports the sidelink HARQ feedback information to the access network device in the indicated first time-frequency resource.

In another possible implementation, the first time-frequency resource is implicitly indicated by the access network device, that is, the first time-frequency resource is obtained by the first terminal according to the defined mapping rule. The first time-frequency resource includes a PUCCH resource mapped according to a third time-frequency resource used for transmitting the DCI.

Optionally, the first terminal receives DCI transmitted by the access network device, and determines the first time-frequency resource based on the mapping relation according to the third time-frequency resource used by DCI transmission.

Optionally, the mapping rule is predefined or preconfigured.

For example, the mapping rule of the first time-frequency resource and the third time-frequency resource includes that, the frequency domain starting position of the first time-frequency resource is the same as that of the third time-frequency resource, and the time unit used by the first time-frequency resource is the Nth time unit after the time unit used by the third time-frequency resource, where N is a positive integer.

When the first terminal doesn't receive the sidelink HARQ feedback information transmitted by the second terminal before reporting the sidelink HARQ feedback information, the first terminal transmits the sidelink HARQ feedback information configured to indicate NACK to the access network device.

At step 307, the access network device receives sidelink HARQ feedback information reported by the first terminal.

Optionally, the access network device receives the sidelink HARQ feedback information reported by the first terminal in the first time-frequency resource through the PUCCH.

In summary, in this embodiment, the first time-frequency resource includes the PUCCH resource preconfigured for transmitting uplink HARQ feedback information of downlink data, so that the first terminal may report the sidelink HARQ feedback information to the access network device by reusing the PUCCH resource, and further the access network device doesn't need to configure a dedicated PUCCH resource set for the sidelink HARQ feedback information, which saves the signal interaction process between the access network device and the first terminal, and improves the utilization rate of the PUCCH resource configured to transmit the uplink HARQ feedback information of the downlink data.

Moreover, in this embodiment, the data transmission parameter is indicated by the access network device to the first terminal in an explicit manner, the data transmission parameter being configured to indicate the first time-frequency resource and/or the second time-frequency resource, so that the first terminal or the second terminal may quickly determine a time-frequency resource used to transmit the sidelink HARQ feedback information, which improves the efficiency of HARQ feedback.

Moreover, in this embodiment, the data transmission parameter is indicated by the access network device to the first terminal in an implicit manner, the data transmission parameter being configured to indicate the first time-frequency resource and/or the second time-frequency resource, so that there is no need to carry an explicit field configured to indicate the time-frequency resource of the sidelink HARQ feedback information in the signaling interaction process among the access network device, the first terminal and the second terminal, and the first terminal or the second terminal may quickly determine a time-frequency resource configured to transmit the sidelink HARQ feedback information by themselves or according to the mapping rule, which further reduces the data amount needed to be carried in the signaling interaction process among the access network device, the first terminal and the second terminal.

The following are apparatus embodiments of the present disclosure, which may be configured to implement the method embodiments of the present disclosure. For details not disclosed in the apparatus embodiments of the present disclosure, please refer to the method embodiments of the present disclosure.

Figure 4:
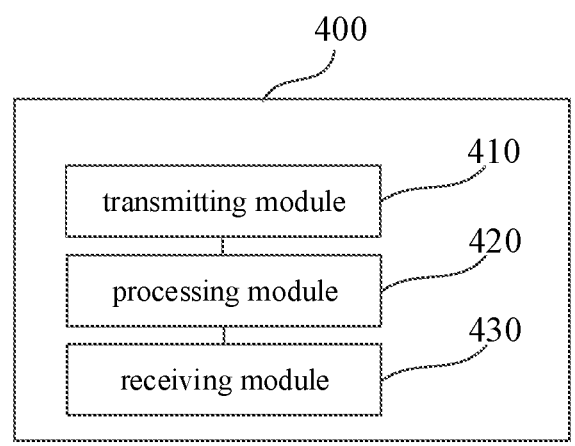
FIG. 4 is a block diagram illustrating a data transmission apparatus for direct communication according to an exemplary embodiment.

FIG. 4 is a block diagram illustrating a data transmission apparatus for direct communication according to an exemplary embodiment. The apparatus has the function of implementing the above method example at the first terminal side, in which the function may be achieved by hardware, or by hardware executing the corresponding software. The apparatus 400 may include a transmitting module 410, a processing module 420 and a receiving module 430.

The transmitting module 410 is configured to transmit sidelink data to a second terminal through a sidelink according to DCI transmitted by an access network device.

The receiving module 430 is configured to receive HARQ feedback information fed back by the second terminal, the sidelink HARQ feedback information being configured to indicate a receiving state corresponding to the sidelink data.

The transmitting module 410 is configured to report the HARQ feedback information to the access network device.

Optionally, the transmitting module 410 is configured to report the sidelink HARQ feedback information to the access network device in a first time-frequency resource through a PUCCH.

Optionally, the first time-frequency resource includes: a PUCCH resource preconfigured for transmitting uplink HARQ feedback information of downlink data; or a PUCCH resource preconfigured to be used by the first terminal for reporting the sidelink HARQ feedback; or a PUCCH resource mapped according to a third time-frequency resource used for transmitting the DCI.

Optionally, the receiving module 430 is further configured to receive the sidelink HARQ feedback information fed back by the second terminal in a second time-frequency resource through a PSFCH.

Optionally, the second time-frequency resource includes: a PSFCH resource preconfigured to be used by the second terminal for transmitting the sidelink HARQ feedback to the first terminal; or a PSFCH resource mapped by the second terminal according to a fourth time-frequency resource used for transmitting the sidelink data; or a PSFCH resource mapped by the second terminal according to the first time-frequency resource used by the first terminal for reporting the sidelink HARQ feedback information; or a PSFCH resource configured by the first terminal and the second terminal according to the first time-frequency resource and a preset timing relationship.

Optionally, the apparatus further includes: a processing module 420, configured to determine data transmission parameters indicated by the access network device in an explicit manner or an implicit manner, the data transmission parameters being configured to indicate the first time-frequency resource and/or the second time-frequency resource.

Optionally, the DCI carries data transmission parameters configured to indicate the first time-frequency resource and the second time-frequency resource; the transmitting module 410 is further configured to transmit the data transmission parameter configured to indicate the second time-frequency resource to the second terminal.

Optionally, the data transmission parameters include at least one of: a first physical resource indicator, configured to represent a time domain and/or frequency domain resource used by the first terminal for reporting the sidelink HARQ feedback information; a first feedback timing indicator, configured to represent a time interval between the sidelink data transmission and reporting the corresponding sidelink HARQ feedback information by the first terminal; a second physical resource indicator, configured to represent a time domain and/or frequency domain resource used by the second terminal for transmitting the sidelink HARQ feedback information; a second feedback timing indicator, configured to represent a time interval between the sidelink data transmission and feeding back the corresponding sidelink HARQ feedback information by the second terminal.

Optionally, the receiving module 430 is further configured to receive a first configuration signaling transmitted by the access network device, the first configuration signaling being configured to indicate a first time interval set and/or a PUCCH resource set corresponding to the sidelink HARQ feedback information; in which, the PUCCH resource set includes a plurality of PUCCH resources configured to report the sidelink HARQ feedback information, and the first time interval set includes configured time intervals between the sidelink data transmission and reporting the corresponding sidelink HARQ feedback information by the first terminal.

Optionally, the first configuration signaling is a first RRC signaling, the first RRC signaling including a first newly added field and a second newly added field, the first newly added field being configured to indicate the PUCCH resource set, and the second newly added field being configured to indicate the first time interval set.

Optionally, the receiving module 403 is further configured to receive a second configuration signaling transmitted by the access network device, the second configuration signal-ing being configured to indicate a second time interval set and/or a PSFCH resource set corresponding to the sidelink HARQ feedback information.

The PSFCH resource set includes a plurality of PSFCH resources configured to report the sidelink HARQ feedback information, and the second time interval set includes configured time intervals between the sidelink data transmission and feeding back the corresponding sidelink HARQ feedback information by the second terminal.

Optionally, the second configuration signaling is a second RRC signaling, the second RRC signaling including a third newly added field and a fourth newly added field, the third newly added field being configured to indicate the PSFCH resource set, and the fourth newly added field being configured to indicate the second time interval set.

In summary, in this embodiment, the first terminal transmits sidelink data to the second terminal through a sidelink, receives HARQ feedback information fed back by the second terminal, the sidelink HARQ feedback information being configured to indicate the receiving state corresponding to the sidelink data, and reports the sidelink HARQ feedback information to the access network device. Therefore, in the direct communication scenario based on scheduling of an access network device, even if the first terminal and the second terminal may be in the coverage ranges of different access network devices or beyond the coverage of the network, the sidelink HARQ feedback information may be transmitted from the second terminal to the first terminal first, and then reported by the first terminal to the access network device, which ensures the success rate of information transmitting and receiving in the direct communication scenario and improves the efficiency of data transmission.

Figure 5:
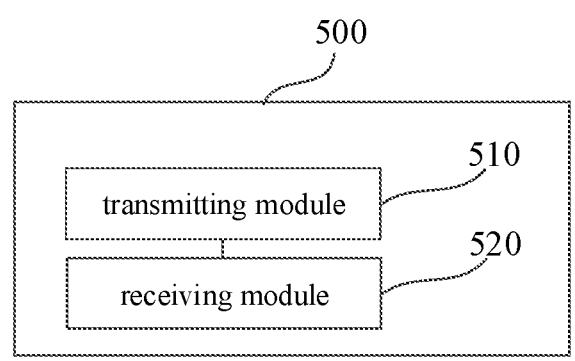
FIG. 5 is a block diagram illustrating a data transmission apparatus for direct communication according to another exemplary embodiment.

FIG. 5 is a block diagram illustrating a data transmission apparatus for direct communication according to an exemplary embodiment. The apparatus has the function of implementing the above method example at the access network device side, in which the function may be achieved by hardware, or by hardware executing the corresponding software. The apparatus 500 may include a transmitting module 510 and a receiving module 520.

The transmitting module 510 is configured to transmit DCI to a first terminal, the DCI being configured to indicate the first terminal to transmit sidelink data to a second terminal through a sidelink, receive sidelink HARQ feedback information fed back by the second terminal, the sidelink HARQ feedback information being configured to indicate a receiving state corresponding to the sidelink data, and report the sidelink HARQ feedback information to the access network device.

The receiving module 520 is configured to receive the sidelink HARQ feedback information reported by the first terminal.

Optionally, the receiving module 520 is further configured to receive the sidelink HARQ feedback information transmitted by the first terminal in a first time-frequency resource through a PUCCH.

Optionally, the first time-frequency resource includes: a PUCCH resource preconfigured for transmitting uplink HARQ feedback information of downlink data; or a PUCCH resource preconfigured to be used by the first terminal for reporting the sidelink HARQ feedback; or a PUCCH resource mapped according to a third time-frequency resource used for transmitting the DCI.

Optionally, the transmitting module 510 is further configured to indicate data transmission parameters to the first terminal in an explicit manner or an implicit manner, the data transmission parameters being configured to indicate the first time-frequency resource and/or the second time-frequency resource.

Optionally, the DCI carries the data transmission parameters configured to indicate the first time-frequency resource and the second time-frequency resource, and the DCI is configured to indicate the first terminal to transmit the data transmission parameter configured to indicate the second time-sequence resource to the second terminal.

Optionally, the second time-frequency resource includes: a PSFCH resource preconfigured to be used by the second terminal for transmitting the sidelink HARQ feedback to the first terminal; or a PSFCH resource mapped by the second terminal according to a fourth time-frequency resource used for transmitting the sidelink data; or a PSFCH resource mapped by the second terminal according to the first time-frequency resource used by the first terminal for reporting the sidelink HARQ feedback information; or a PSFCH resource configured by the first terminal or the second terminal according to the first time-frequency resource and a preset timing relationship.

Optionally, the data transmission parameters include at least one of: a first physical resource indicator, configured to represent a time domain and/or frequency domain resource used by the first terminal for reporting the sidelink HARQ feedback information; a first feedback timing indicator, configured to represent a time interval between the sidelink data transmission and reporting the corresponding sidelink HARQ feedback information by the first terminal; a second physical resource indicator, configured to represent a time domain and/or frequency domain resource used by the second terminal for transmitting the sidelink HARQ feedback information; a second feedback timing indicator, configured to represent a time interval between the sidelink data transmission and feeding back the corresponding sidelink HARQ feedback information by the second terminal.

Optionally, the transmitting module 510 is further configured to transmit a first configuration signaling to the first terminal, the first configuration signaling being configured to indicate a first time interval set and/or a PUCCH resource set corresponding to the sidelink HARQ feedback information.

The PUCCH resource set includes a plurality of PUCCH resources configured to report the sidelink HARQ feedback information, and the first time interval set includes configured time intervals between the sidelink data transmission and reporting the corresponding sidelink HARQ feedback information by the first terminal.

Optionally, the first configuration signaling is a first RRC signaling, the first RRC signaling including a first newly added field and a second newly added field, the first newly added field being configured to indicate the PUCCH resource set, and the second newly added field being configured to indicate the first time interval set.

Optionally, the transmitting module 510 is further configured to transmit a second configuration signaling to the first terminal and/or the second terminal, the second configuration signaling being configured to indicate a second time interval set and/or a PSFCH resource set corresponding to the sidelink HARQ feedback information.

The PSFCH resource set includes a plurality of PSFCH resources configured to report the sidelink HARQ feedback information, and the second time interval set includes configured time intervals between the sidelink data transmission and feeding back the corresponding sidelink HARQ feedback information by the second terminal.

Optionally, the second configuration signaling is a second RRC signaling, the second RRC signaling including a third newly added field and a fourth newly added field, the third newly added field being configured to indicate the PSFCH resource set, and the fourth newly added field being configured to indicate the second time interval set.

It should be noted that, when the apparatus provided in the above embodiments implement its function, the division of the above function modules is only given as an example. In practical applications, the above functions may be allocated to different function modules according to actual requirements, that is, the content structure of the device is divided into different function modules to complete all or part of functions described above.

With regard to the apparatus in the above embodiments, the specific way in which each module performs the operation has been described in detail in the embodiments of the method and will not be elaborated here.

The technical solution provided in embodiments of the present disclosure is introduced mainly from the perspective of interaction among an access network device, the first terminal and the second terminal. It should be understood that, the device (including the access network device, the first terminal and the second terminal.) includes hardware structures and/or software modules that execute various functions, in order to implement the above functions. In combination with the units and algorithm steps of the examples described in embodiments of the present disclosure, the embodiments of the present disclosure may be implemented in the form of hardware or a combination of hardware and computer software. Whether a function is executed by hardware or computer software driven by hardware depends on the specific application and design constraints of the technical solution. Those skilled in the art may adopt different methods for each specific application to implement the described functions, but such implementation should not be considered as beyond the scope of the technical solutions of embodiments of the present disclosure.

Figure 6:
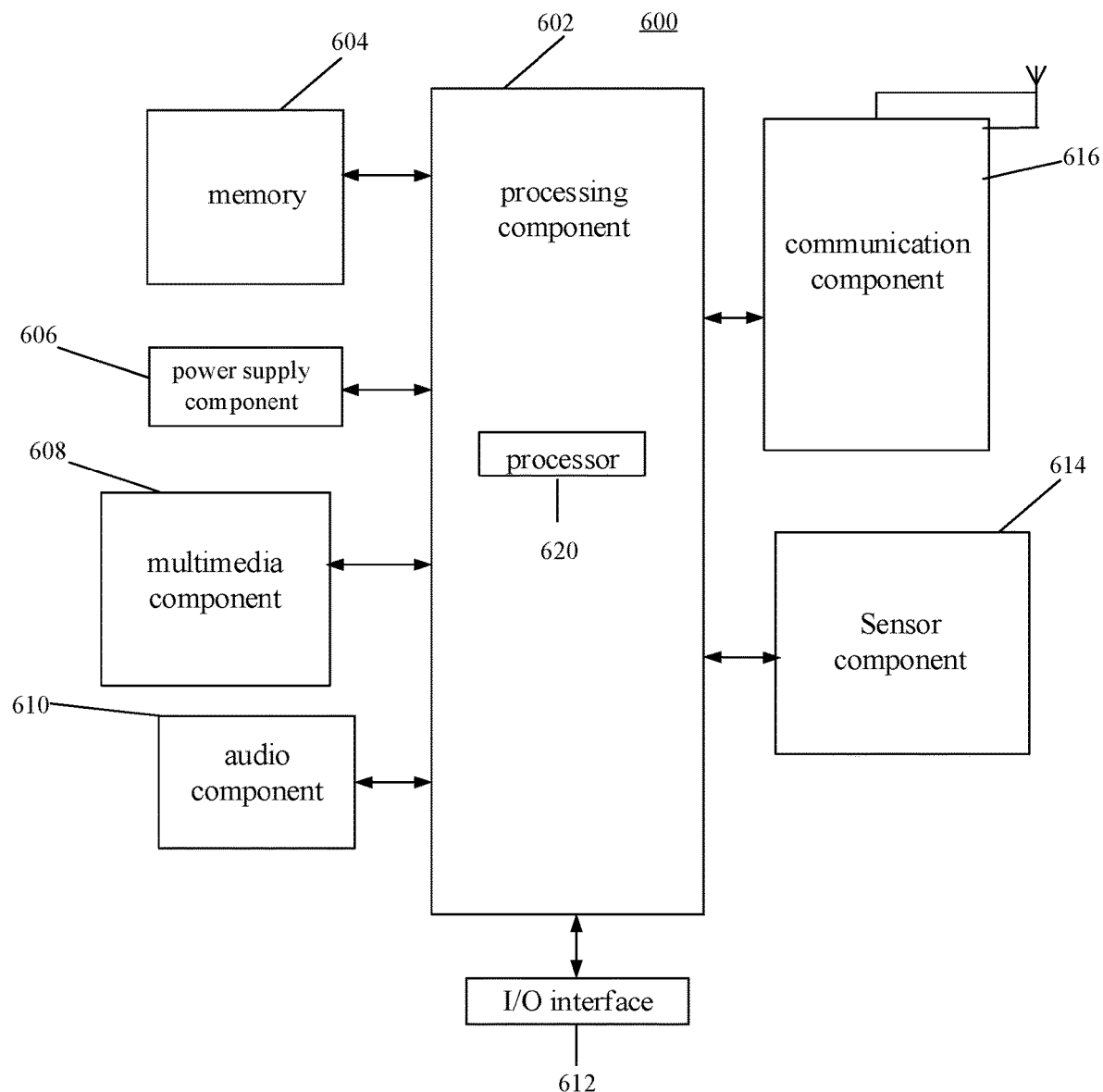
FIG. 6 is a block diagram illustrating a terminal according to an exemplary embodiment.

FIG. 6 is a block diagram illustrating a terminal 600 according to an exemplary embodiment. For example, the terminal 600 may be a mobile phone, a computer, a digital broadcasting terminal, a messaging device, a game console, a tablet device, a medical device, a fitness equipment, a personal digital assistant, etc.

As illustrated in FIG. 6, the terminal 600 may include one or more of following components: a processing component 602, a memory 604, a power supply component 606, a multimedia component 608, an audio component 610, an input/output (I/O) interface 612, a sensor component 614, and a communication component 616.

The processing component 602 generally controls the whole operation of the terminal 600, such as the operations related to display, phone call, data communication, camera operation and recording operation. The processing component 602 may include one or more processors 620 to perform instructions, to complete all or part of blocks of the above method. In addition, the processing component 602 may include one or more modules for the convenience of interaction between the processing component 602 and other components. For example, the processing component 602 may include a multimedia module for the convenience of interaction between the multimedia component 608 and the processing component 602.

The memory 604 is configured to store all types of data to support the operation of the apparatus 600. Examples of the data include the instructions of any applications or methods operated on terminal 600, contact data, phone book data, messages, pictures, videos, etc. The memory 604 may be implemented by any type of volatile or non-volatile storage devices or their combination, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), Magnetic Memory, Flash Memory, Magnetic Disk or Optical Disk.

The power supply component 606 may provide power supply for all components of the terminal 600. The power supply component 606 may include power supply management system, one or more power supplies, and other components related to generating, managing and distributing power for the terminal 600.

The multimedia component 608 includes an output interface screen provided between the terminal 600 and the user. In some embodiments, a screen may include a liquid crystal display (LCD) and a touch panel (TP). If the screen includes a touch panel, the screen may be implemented as a touch screen to receive input signals from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 608 include a front camera and/or a rear camera. When the apparatus 600 is in operation mode, such as shooting mode or video mode, the front camera or the rear camera may receive the external multimedia data. Each front camera and rear camera may be a fixed optical lens system or an optical lens system with focal length and optical zoom capacity.

The audio component 610 is configured as output and/or input signal. For example, the audio component 610 includes a microphone (MIC). When the terminal 600 is in operation mode, such as call mode, record mode, and speech recognition mode, the microphone is configured to receive the external audio signals. The audio signals received may be further stored in the memory 604 or sent via the communication component 616. In some embodiments, the audio component 610 further includes a speaker configured to an output audio signal.

The I/O interface 612 provides an interface for the processing component 602 and the peripheral interface module, and the peripheral interface module may be a keyboard, a click wheel, a button, etc. The buttons may include but not limited to a home button, a volume button, a start button and a lock button.

The sensor component 614 includes one or more sensors, configured to provide various aspects of status assessment for the terminal 600. For example, the sensor component 614 may detect the on/off state of the device 600 and the relative positioning of the component. For example, the component is the display and the keypad of the terminal 600, the sensor component 614 may also detect the location change of the terminal 600 or one component of the terminal 600, the presence or absence of contact between the user and the terminal 600, the orientation or acceleration/deceleration of the terminal 600, and the temperature change of the terminal 600. The sensor component 614 may include a proximity sensor, which is configured to detect the existence of the objects nearby without any physical contact. The sensor component 614 may further include a light sensor such as CMOS or CCD image sensor, which is configured to use in imaging applications. In some embodiments, the sensor component 614 may further include an acceleration transducer, a gyroscope sensor, a magnetic sensor, a pressure sensor or a temperature sensor.

The communication component 616 may be configured for the convenience of wired or wireless communication between the terminal 600 and other devices. The terminal 600 may access wireless networks based on communication standard, such as WiFi, 2G or 3G, or their combination. In an exemplary embodiment, the communication component 616 receives broadcast signals or broadcast-related information from an external broadcast management system via a broadcast channel. In an exemplary embodiment, the communication component 616 further includes a near field communication (NFC) module to facilitate short-range communication.

In an exemplary embodiment, the terminal 600 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an exemplary embodiment, a non-temporary computer readable storage medium is further provided which includes instructions, such as the memory 604 including instructions, in which the instructions may be executed by the processor 620 of the terminal 600 to complete the above methods. For example, the non-temporary computer readable storage medium may be a ROM, a random access memory (RAM), a CD-ROM, a magnetic tape, a floppy disk, an optical data storage device, etc.

A non-transitory computer readable storage medium is further provided. When instructions in the non-transitory computer readable storage medium are executed by the processor of the first terminal, the first terminal is enabled to execute the data transmission method described above.

Figure 7:
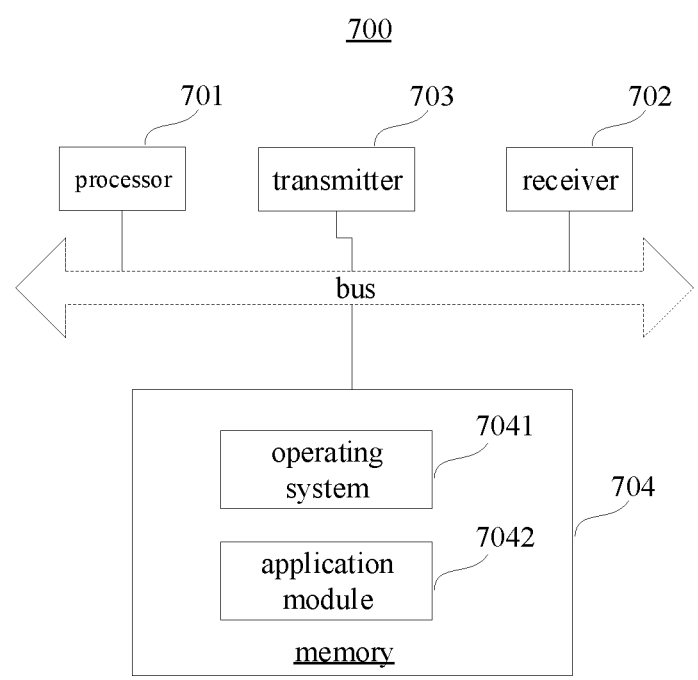
FIG. 7 is a block diagram illustrating an access network device according to an exemplary embodiment.

FIG. 7 is a block diagram illustrating an access network device 700 according to an exemplary embodiment.

The access network device 700 may include a processor 701, a receiver 702, a transmitter 703 and a memory 704. The receiver 702, the transmitter 703 and the memory 704 are connected to the processor 701 through a bus.

The processor 701 include one or more processing cores, and the processor 701 executes the method executed by the access network device in the method provided by the embodiment of the present disclosure by running software programs or modules. The memory 704 may be configured to store software programs and modules. Specifically, the memory 704 may store an operating system 7041 and an application module 7042 required by at least one function. The receiver 702 is configured to receive the communication data transmitted by other devices, and the transmitter 703 is configured to transmit communication data to other devices.

One exemplary embodiment of the present disclosure further provides a data transmission system for direct communication. The data transmission system includes a terminal and an access network device.

The terminal is a data transmission apparatus provided in the embodiment as illustrated in FIG. 4.

The access network is a data transmission apparatus provided in the embodiment as illustrated in FIG. 5.

One exemplary embodiment of the present disclosure further provides a data transmission system for direct communication. The data transmission system includes a terminal and an access network device.

The terminal is a terminal provided in the embodiment as illustrated in FIG. 6.

The access network is an access network device provided in the embodiment as illustrated in FIG. 7.

One exemplary embodiment of the present disclosure further provides a computer readable storage medium, in which the computer readable storage medium stores at least one instruction, at least one program, a code set and an instruction set, the at least one instruction, the at least one program, the code set or the instruction set being configured to be loaded and executed by the processor to implement the steps executed by the first terminal or the access network device in the data transmission method of sidelink data provided in each method embodiment.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present invention is not limited to the precise structure described above and shown in the drawings, and various modifications and changes may be made without departing from its scope. The scope of the present application is only limited by the appended claims.

What is claimed is:

1. A data transmission method for direct communication, comprising:
   transmitting, by a first terminal, sidelink data to a second terminal through a sidelink according to information transmitted by an access network device;
   receiving, by the first terminal, sidelink hybrid auto repeat request (HARQ) feedback information fed back by the second terminal, the sidelink HARQ feedback information being configured to indicate a receiving state corresponding to the sidelink data;
   reporting, by the first terminal, the sidelink HARQ feedback information to the access network device, wherein, reporting the sidelink HARQ feedback information to the access network device, comprises: reporting the sidelink HARQ feedback information to the access network device in a first time-frequency resource through a physical uplink control channel (PUCCH); and
   receiving a first configuration signaling transmitted by the access network device, the first configuration signaling being configured to indicate a first time interval set, wherein the first time interval set is corresponding to the sidelink HARQ feedback information,
   wherein the first time interval set comprises configured time intervals between sidelink data transmission and reporting corresponding sidelink HARQ feedback information by the first terminal.

2. The method of claim 1, wherein, the first time-frequency resource comprises one of following parameters:
   a PUCCH resource preconfigured for transmitting uplink HARQ feedback information of downlink data;
   a PUCCH resource preconfigured to be used by the first terminal for reporting the sidelink HARQ feedback; or
   a PUCCH resource mapped according to a third time-frequency resource used for transmitting the information transmitted by the access network device.

3. The method of claim 1, wherein, receiving the sidelink HARQ feedback information fed back by the second terminal, comprises:
   receiving the sidelink HARQ feedback information fed back by the second terminal in a second time-frequency resource through a physical sidelink feedback channel (PSFCH).

4. The method of claim 3, wherein, the second time-frequency resource comprises one of following parameters:
   a PSFCH resource preconfigured to be used by the second terminal for transmitting the sidelink HARQ feedback to the first terminal;
   a PSFCH resource mapped by the second terminal according to a fourth time-frequency resource used for transmitting the sidelink data;
   a PSFCH resource mapped by the second terminal according to the first time-frequency resource used by the first terminal for reporting the sidelink HARQ feedback information; or
   a PSFCH resource configured by the first terminal or the second terminal according to the first time-frequency resource and a preset timing relationship.

5. The method of claim 1, further comprising:
   determining data transmission parameters indicated by the access network device in an explicit manner or an implicit manner, the data transmission parameters being configured to indicate the first time-frequency resource, a second time-frequency resource, or the first time-frequency resource and second time-frequency resource.

6. The method of claim 5, wherein, the data transmission parameters configured to indicate the first time-frequency resource and the second time-frequency resource are carried by the information transmitted by the access network device, and the method further comprises:
   transmitting the data transmission parameters configured to indicate the second time-frequency resource to the second terminal.

7. The method of claim 5, wherein, the data transmission parameters comprise at least one of following parameters:
   a first physical resource indicator, configured to represent a time domain resource, a frequency domain resource, or the time domain resource and the frequency domain resource, wherein the time domain resource and the frequency domain resource are used by the first terminal for reporting the sidelink HARQ feedback information;
   a first feedback timing indicator, configured to represent a time interval between sidelink data transmission and reporting corresponding sidelink HARQ feedback information by the first terminal;
   a second physical resource indicator, configured to represent a time domain resource, a frequency domain resource, or the time domain resource and the frequency domain resource, wherein the time domain resource and the frequency domain resource are used by the second terminal for transmitting the sidelink HARQ feedback information; or
   a second feedback timing indicator, configured to represent a time interval between the sidelink data transmission and feeding back corresponding sidelink HARQ feedback information by the second terminal.

8. The method of claim 1,
   wherein the first configuration signaling is further configured to indicate a PUCCH resource set, or the first time interval set and the PUCCH resource set, wherein the PUCCH resource set and the first time interval set are corresponding to the sidelink HARQ feedback information;

wherein, the PUCCH resource set comprises a plurality of PUCCH resources configured to report the sidelink HARQ feedback information.

9. The method of claim 8, wherein, the first configuration signaling is a first radio resource control (RRC) signaling, the first RRC signaling comprises a first newly added field and a second newly added field, the first newly added field is configured to indicate the PUCCH resource set, and the second newly added field is configured to indicate the first time interval set.

10. The method of claim 3, further comprising:
receiving a second configuration signaling transmitted by the access network device, the second configuration signaling being configured to indicate a second time interval set, a PSFCH resource set, or the second time interval set and the PSFCH resource set, wherein the second time interval set and the PSFCH resource set are corresponding to the sidelink HARQ feedback information;

wherein, the PSFCH resource set comprises a plurality of PSFCH resources configured to report the sidelink HARQ feedback information, and the second time interval set comprises configured time intervals between sidelink data transmission and feeding back corresponding sidelink HARQ feedback information by the second terminal.

11. The method of claim 10, wherein, the second configuration signaling is a second radio resource control (RRC) signaling, the second RRC signaling comprises a third newly added field and a fourth newly added field, the third newly added field is configured to indicate the PSFCH resource set, and the fourth newly added field is configured to indicate the second time interval set.

12. A data transmission method for direct communication, comprising:
transmitting, by an access network device, information to a first terminal, the information being configured to instruct the first terminal to transmit sidelink data to a second terminal through a sidelink, receive sidelink hybrid auto repeat request (HARQ) feedback information fed back by the second terminal and report the sidelink HARQ feedback information to the access network device, the sidelink HARQ feedback information being configured to indicate a receiving state corresponding to the sidelink data;
receiving, by the access network device, the sidelink HARQ feedback information reported by the first terminal, wherein receiving the sidelink HARQ feedback information reported by the first terminal comprises:
receiving the sidelink HARQ feedback information transmitted by the first terminal in a first time-frequency resource through a physical uplink control channel (PUCCH); and
transmitting a first configuration signaling to the first terminal, the first configuration signaling being configured to indicate a first time interval set, wherein the first time interval set is corresponding to the sidelink HARQ feedback information;
wherein the first time interval set comprises configured time intervals between sidelink data transmission and reporting corresponding sidelink HARQ feedback information by the first terminal.

13. The method of claim 12, further comprising:
indicating data transmission parameters to the first terminal in an explicit manner or an implicit manner, the data transmission parameters being configured to indicate the first time-frequency resource, a second time-frequency resource, or the first time-frequency resource and the second time-frequency resource.

14. The method of claim 13, wherein, the data transmission parameters configured to indicate the first time-frequency resource and the second time-frequency resource are carried by the information transmitted by the access network device, and the information transmitted by the access network device is configured to instruct the first terminal to transmit the data transmission parameters configured to indicate the second time-sequence resource to the second terminal.

15. The method of claim 12, wherein the first configuration signaling is further configured to indicate a PUCCH resource set, or the first time interval set and the PUCCH resource set, wherein the first time interval set and the PUCCH resource set are corresponding to the sidelink HARQ feedback information;
Wherein, the PUCCH resource set comprises a plurality of PUCCH resources configured to report the sidelink HARQ feedback information.

16. The method of claim 12, further comprising:
transmitting a second configuration signaling to the first terminal, the second terminal, or the first terminal and the second terminal, the second configuration signaling being configured to indicate a second time interval set, a PSFCH resource set, or the second time interval set and the PSFCH resource set, wherein the second time interval set and the PSFCH resource set are corresponding to the sidelink HARQ feedback information;
wherein, the PSFCH resource set comprises a plurality of PSFCH resources configured to report the sidelink HARQ feedback information, and the second time interval set comprises configured time intervals between sidelink data transmission and feeding back corresponding sidelink HARQ feedback information by the second terminal.

17. A terminal, comprising:
a processor;
a transceiver connected to the processor;
a memory configured to store instructions executable by the processor;
wherein, the processor is configured to implement acts comprising:
transmitting sidelink data to a second terminal through a sidelink according to information transmitted by an access network device;
receiving sidelink hybrid auto repeat request (HARQ) feedback information fed back by the second terminal, the sidelink HARQ feedback information being configured to indicate a receiving state corresponding to the sidelink data; and
reporting the sidelink HARQ feedback information to the access network device, wherein reporting the sidelink HARQ feedback information to the access network device comprises: reporting the sidelink HARQ feedback information to the access network device in a first time-frequency resource through a physical uplink control channel (PUCCH); and
receiving a first configuration signaling transmitted by the access network device, the first configuration signaling being configured to indicate a first time interval set, wherein the first time interval set is corresponding to the sidelink HARQ feedback information, wherein the first time interval set comprises configured time intervals between sidelink data transmission and reporting corresponding sidelink HARQ feedback information by the terminal.

18. An access network device, comprising:

a processor;

a transceiver connected to the processor;

a memory configured to store instructions executable by the processor;

wherein, the processor is configured to perform steps of the method of claim 12.

* * * * *